United States Patent [19]

Fujimori et al.

[11] 4,438,229
[45] Mar. 20, 1984

[54] THERMOPLASTIC COMPOSITION

[75] Inventors: Yoshitugu Fujimori, Tokorozawa; Yasuo Takabori, Shiki; Hajime Sakano, Hirakata; Akitoshi Ito, Nabari, all of Japan

[73] Assignees: Sumitomo Naugatuck Co., Ltd., Osaka; Honda Motor Co., Ltd., Tokyo, both of Japan

[21] Appl. No.: 415,870

[22] Filed: Sep. 8, 1982

[30] Foreign Application Priority Data

Sep. 9, 1981 [JP] Japan ............................. 56-143076
Nov. 12, 1981 [JP] Japan ............................. 56-182127

[51] Int. Cl.$^3$ .................................................. C08L 69/00
[52] U.S. Cl. ..................................... 524/109; 524/114; 524/145; 524/504; 525/67
[58] Field of Search .................. 525/67; 524/109, 114, 524/145, 504

[56] References Cited

U.S. PATENT DOCUMENTS

| 3,404,122 | 10/1968 | Fritz et al. | 524/145 |
| 3,663,471 | 5/1972 | Schirmer et al. | 525/67 |
| 3,893,966 | 7/1975 | Stein et al. | 524/504 |
| 3,965,064 | 6/1976 | Mercier et al. | 524/145 |
| 3,988,389 | 10/1976 | Margotte et al. | 525/67 |
| 4,043,947 | 8/1977 | Talsma et al. | 524/145 |
| 4,315,081 | 2/1982 | Kobayashi et al. | 525/67 |
| 4,367,310 | 1/1983 | Henton | 525/67 |

FOREIGN PATENT DOCUMENTS 28753  5/1981  European Pat. Off. ............. 525/67

Primary Examiner—Ronald W. Griffin
Attorney, Agent, or Firm—Jones, Tullar & Cooper

[57] ABSTRACT

A thermoplastic composition which comprises a blend comprising 20 to 80% by weight of a polycarbonate resin and 80 to 20% by weight of a graft polymer obtained by grafting at least one aromatic vinyl compound and at least one of vinyl cyanides and alkyl unsaturated carboxylates onto a conjugated diene rubber or its mixture with a copolymer of at least one aromatic vinyl compound and at least one of vinyl cyanides and alky unsaturated carboxylates in an amount of not more than 90% by weight on the basis of the combined amount of the graft polymer and the copolymer, and a polyolefin or a plasticizer having a light transmission of not less than 70% when determined on the film of 20 microns in thickness prepared by the use of a solution of the plasticizer (0.25 g) and acrylonitrile-styrene copolymer (weight ratio of acrylonitrile and styrene, 30:70; 0.75 g) in acetone (10 ml), the weight proportion of the blend and the polyolefin or the plasticizer being 100:0.2-20. The resulting composition is excellent in solvent resistance, welding strength, impact resistance, molding property, etc.

7 Claims, 1 Drawing Figure

THERMOPLASTIC COMPOSITION

BACKGROUND OF THE INVENTION

The present invention relates to a thermoplastic composition. More particularly, it relates to a thermoplastic resin composition having excellent solvent resistance, weld strength, impact resistance, molding properties, etc.

Hitherto, attempts have been made to improve the molding properties and the dependency of the impact strength on thickness of polycarbonate resins by incorporating therein diene rubber graft polymers such as ABS resins (acrylonitrile-butadiene-styrene polymers) or MBS resins (methyl methacrylate-butadiene-styrene polymers) (cf. Japanese Patent Publns. (examined) Nos. 15225/1963, 71/1964 and 11496/1967). Attempts have also been made to improve the impact strength of polycarbonate resins by incorporating therein ABS resins manufactured by bulk-suspension polymerization (cf. Japanese Patent Publn. (examined) No. 11142/1976). However, the resulting compositions are only improved in apparent molding properties, and when a plurality of gates are provided in injection molding as in the most popular molding procedure, the strength at the welded parts is insufficient. Also, the resistance to solvent is unsatisfactory.

DESCRIPTION OF THE INVENTION

Figure 1:
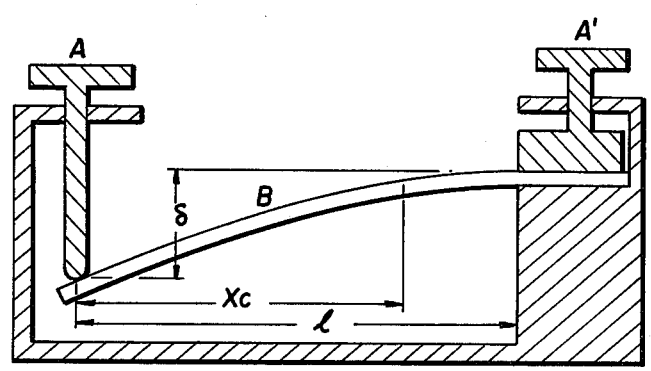
FIG. 1 is a schematic representation of a measuring apparatus employed in the Examples.

As a result of an extensive study to provide a thermoplastic composition comprising a polycarbonate resin and a graft polymer as the essential components and having improved chemical and physical properties, particularly solvent resistance and weld strength, it has now been found that incorporation of a small amount of a polyolefin or a certain plasticizer into such composition is effective in improvement of solvent resistance and weld strength. Advantageously, the resulting composition has excellent processability.

The thermoplastic composition of the invention comprises a blend comprising 20 to 80% by weight of a polycarbonate resin and 80 to 20% by weight of a graft polymer obtained by grafting at least one aromatic vinyl compound and at least one of vinyl cyanides and alkyl unsaturated carboxylates onto a conjugated diene rubber or its mixture with a copolymer of at least one aromatic vinyl compound and at least one of vinyl cyanides and alkyl unsaturated carboxylates in an amount of not more than 90% by weight on the basis of the combined amount of the graft polymer and the copolymer, and a polyolefin or a plasticizer having a light transmission of not less than 70% when determined on the film of 20 microns in thickness prepared by the use of a solution of the plasticizer (0.25 g) and acrylonitrile-styrene copolymer (weight ratio of acrylonitrile and styrene, 30:70; 0.75 g) in acetone (10 ml), the weight proportion of the blend and the polyolefin or the plasticizer being 100:0.2-20.

As the polycarbonate resin, there may be used any one chosen from aromatic polycarbonates, aliphatic polycarbonates, aliphatic aromatic polycarbonates, etc. Examples are polymers comprising units of bisphenols such as 2,2-bis(4-hydroxyphenyl)alkanes, bis(4-hydroxyphenyl)ethers, bis(4-hydroxyphenyl)sulfones, bis(4-hydroxyphenyl)sulfides and bis(4-hydroxyphenyl)sulfoxides. When desired, said bisphenols may be substituted with halogen. These and other polycarbonate resins and their production are explained in detail in Encyclopedia of Polymer Science and Technology, 10, p. 710–764 (1969) (published by John Wiley and Sons, Inc.) and literatures cited therein.

As the graft polymer, there is used the one grafting at least one aromatic vinyl compound and at least one of vinyl cyanides and alkyl unsaturated carboxylates onto a conjugated diene rubber. Examples of the conjugated diene rubber are polybutadiene, butadiene-styrene copolymer, butadiene-acrylonitrile copolymer, etc. Examples of the aromatic vinyl compound are styrene, α-methylstyrene, dimethylstyrene, vinyltoluene, etc. Examples of the vinyl cyanide are acrylonitrile, methacrylonitrile, etc. Examples of the alkyl unsaturated carboxylate are lower alkyl acrylates (e.g. methyl acrylate, ethyl acrylate, butyl acrylate), lower alkyl methacrylates (e.g. methyl methacrylate, ethyl methacrylate, butyl methacrylate), hydroxy(lower)alkyl acrylate (e.g. hydroxyethyl acrylate), hydroxy(lower)alkyl methacrylate (e.g. hydroxyethyl methacrylate, hydroxypropyl methacrylate), etc. The weight proportion of the conjugated diene rubber and the monomeric components in the graft polymer may be usually from 5:95 to 70:30. Further, the weight proportion of the aromatic vinyl compound and the other monomeric component(s) consisting of the vinyl cyanide and/or the alkyl unsaturated carboxylate may be normally from 50:50 to 80:20.

As the copolymer, there may be used any copolymer of at least one aromatic vinyl compound with at least one of vinyl cyanides and alkyl unsaturated carboxylates. Examples of the aromatic vinyl compound, the vinyl cyanide and the alkyl unsaturated carboxylate are those as stated above. The weight proportion of the aromatic vinyl compound and the other monomeric component(s) consisting of the vinyl cyanide and/or the alkyl unsaturated carboxylate may be usually from 55:45 to 85:15, although this is not essential. Further, the intrinsic viscosity of the copolymer is preferred to be from 0.60 to 1.50 (determined in dimethylformamide at 30° C.), but this is not limitative.

The proportions of the polycarbonate resin and the graft polymer or its mixture with the copolymer may be ordinarily from 20 to 80% by weight (preferably from 30 to 70% by weight) and from 80 to 20% by weight (preferably from 70 to 30% by weight), respectively. When the polycarbonate resin is present in a higher amount than 80% by weight, the melt viscosity of the resulting composition on the molding becomes too high so that the molding property is deteriorated. Further, the weld strength is not improved. When the polycarbonate resin is present in a smaller amount than 20% by weight, the heat resistance is lowered.

When the copolymer is employed, its amount may be normally not more than 90% by weight on the basis of the combined amount of the graft polymer and the copolymer. When the amount exceeds 90% by weight, satisfactory impact resistance is not obtainable.

In this invention, a polyolefin or a certain plasticizer is incorporated into a blend comprising the polycarbonate resin and the graft polymer with or without the copolymer.

As the polyolefin, there may be used polyethylene, polypropylene, ethylene-propylene copolymer, etc. Their mixture may be also used. In order to assure excellent weld strength and high impact strength, the use of polyethylene having a molecular weight of not less than 2,000 or polypropylene having a molecular weight of not less than 5,000 is favorable. The amount of the polyolefin in the composition may be usually from 0.2 to 10 parts by weight to 100 parts by weight of the blend. When the amount is less than 0.2 part by weight, any improvement of the weld strength and the solvent resistance is not produced. When more than 10 parts by weight, the impact strength is markedly lowered, and the weld strength is not improved.

The plasticizer usable in the invention is the one having a light transmission of not less than 70% when determined on the film of 20 microns in thickness prepared by a solution of the plasticizer (0.25 g) and acryronitrile-styrene copolymer (weight ratio of acrylonitrile and styrene being 30:70; 0.75 g) in acetone (10 ml) while drying under the atmospheric condition. When the plasticizer having a light transmission of more than 70% is used, the purpose of the invention can not be attained. Further, the bleeding of the plasticizer is apt to be produced at the surface of the molded product with the resulting composition. Suitable plasticizers may be chosen from ester compounds prepared from dicarboxylic acids (e.g. phthalic acid, adipic acid, sebacic acid, azelaic acid, maleic acid, fumaric acid, trimellitic acid, citric acid, itaconic acid, lisinoleic acid) and mono or divalent alcohols (e.g. methanol, ethanol, ethylene glycol, propylene glycol), epoxy compounds having epoxy groups in the molecule, phosphate compounds (e.g. diphenyl octyl phosphate, trioctyl phosphate), etc. In case of ester compounds, polymeric ones having a plurality of ester units are favorable to monomeric ones having a single ester unit in volatility. These plasticizers may be employed alone or in combination. The amount of the plasticizer in the composition may be usually from 0.5 to 20 parts by weight to 100 parts by weight of the blend. When the amount is less than 0.5 part by weight, any improvement of the weld strength is not produced. When the amount is more than 20 parts by weight, the heat resistance is remarkably deteriorated.

The graft polymer and the copolymer as above stated may be respectively produced by conventional procedures such as emulsion polymerization, suspension polymerization, bulk polymerization, emulsion-suspension polymerization or bulk suspension polymerization.

Preparation of the thermoplastic composition may be achieved by mixing the said essential and optional components by the aid of a conventional mixing apparatus such as a roll or Bumbury's mixer. When desired, any additive such as a pigment, a dispersant, a lubricant, a filler, a stabilizer, an antistatic agent and a modifier may be incorporated therein.

Practical and presently preferred embodiments of the invention are illustratively shown in the following Examples wherein part(s) and % are by weight, unless otherwise indicated.

EXAMPLES 1 TO 8 AND COMPARATIVE EXAMPLES 1 TO 7

(1) Polycarbonate resin:

Bisphenol A (470 g) and p-t-butylphenol (9.8 g) were suspended in water (1700 ml), and the suspension was stirred while introducing nitrogen therein for 15 minutes to eliminate oxygen therefrom. Then, 45% sodium hydroxide solution (360 g) and methylene chloride (1000 g) were added thereto. The resulting mixture was cooled to 25° C., and phosgene (240 g) was added thereto in 120 minutes. After 15 to 30 minutes, 45% sodium hydroxide solution (75 g) and triethylamine (16 g) were added thereto, and the resulting mixture was stirred for 15 minutes to obtain a polymer solution of high viscosity. The aqueous layer was separated, and the organic layer was washed with water to remove salts and alkalis to obtain a polycarbonate resin.

(2) Graft polymer:

As the graft polymer, commercially available acrylonitrile-butadiene-styrene copolymer ("Kralastic MV" manufactured by Sumitomo Naugatuck) was used.

(3) Polyolefin:

The following commercially available polyolefins were used:

| Polyolefin | Molecular weight |
|---|---|
| Polyethylene ("Mitsui Highwax 110P" manufactured by Mitsui Petrochemical) | 1000 |
| Polyethylene ("Mitsui Highwax 410P" manufactured by Mitsui Petrochemical) | 4000 |
| Polyethylene ("Sumikathene G-801" manufactured by Sumitomo Chemical) | >30000 |
| Polypropylene ("Biscol 550P" manufactured by Sanyo Chemical Industry) | 4000 |
| Polypropylene ("Bistac L" manufactured by Chiba Fine Chemical) | 5000–10000 |

(4) Thermoplastic composition:

The polycarbonate resin, the graft polymer and the polyolefin as stated above were mixed together in a proportion as shown in Table 1 by the aid of Bumbury's mixer at 230° C. for 4 minutes to give a thermoplastic composition.

The physical properties of the obtained thermoplastic composition are shown in Table 1. The solvent resistance and the weld strength were determined in the following manners:

(a) Solvent resistance:

Onto the surface of a press molded plate of the thermoplastic composition, a mixture of toluene and cyclohexane (weight ratio, 3:7) was applied, and the critical strain was calculated according to the following equation:

$$\text{Critical strain} = \frac{3h \cdot Xc \cdot \delta}{2l^3} \times 100 \, (\%)$$

wherein h is the thickness of the test piece (3 mm), Xc is the distance between the maximum deflection point and crack produced point, δ is the distance between the fixed edge and the maximum deflection point and l is the maximum deflection amount. These values were determined by a measuring apparatus as shown in FIG. 1 of the accompanying drawing. This Figure shows illustratively the section view of the measuring apparatus, and A and A' are press bars, B is the test piece and other symbols have the same meanings as above.

(b) Weld strength:

The thermoplastic composition was molded at 260° C. through two gates (each 2.5×2.0 mm), the distance between them being 100 mm, to make a test piece having 3 mm in thickness and 150 mm in length and in width. The test piece was placed on a cylindrical support of 80 mm in height, 120 mm in inner diameter and 126 mm in outer diameter in a low temperature room adjusted to −30° C., and a steel ball of 1 kg was fallen down at the center of the test piece. The maximum energy value (kg.cm) producing no breakage was determined.

tion mixture, there was obtained a copolymer (A) (intrinsic viscosity, 0.50).

TABLE 1

|  |  | Example |  |  |  |  |  |  |  | Comparative Example |  |  |  |  |  |  |
|---|---|---|---|---|---|---|---|---|---|---|---|---|---|---|---|---|
|  |  | 1 | 2 | 3 | 4 | 5 | 6 | 7 | 8 | 1 | 2 | 3 | 4 | 5 | 6 | 7 |
| Thermoplastic composition (part(s)) | Polycarbonate resin | 50 | 55 | 50 | 50 | 55 | 50 | 50 | 50 | 50 | 50 | 50 | 50 | 50 | 90 | 10 |
|  | Graft polymer | 50 | 45 | 50 | 50 | 45 | 50 | 50 | 50 | 50 | 50 | 50 | 50 | 50 | 10 | 90 |
|  | Polyethylene |  |  |  |  |  |  |  |  |  |  |  |  |  |  |  |
|  | "Mitsui Highwax 110P" | 2 | — | — | — | — | 1 | 1 | — | — | 0.1 | — | — | — | — | — |
|  | "Mitsui Highwax 410" | — | 2 | — | — | — | — | — | — | — | — | — | 13 | — | — | 2.5 |
|  | "Sumikathene G-801" | — | — | 2.5 | — | — | — | — | 1.5 | — | — | 0.1 | — | — | 2.5 | — |
|  | Polypropylene |  |  |  |  |  |  |  |  |  |  |  |  |  |  |  |
|  | "Biscol 550" | — | — | — | 2 | — | 1 | — | — | — | — | — | — | 14 | — | — |
|  | "Bistac L"— | — | — | — | 2.5 | — | 1 | 1 | — | — | — | — | — | — | — | — |
| Physical property | Weld strength (−30° C. DuPont impact) (kg/cm) | 40 | 55 | 65 | 35 | 65 | 40 | 55 | 60 | 25 | 25 | 25 | 15 | 15 | 20 | 25 |
|  | Notched Izod impact strength (¼", 20° C.) (kg.cm/cm) | 41.0 | 63.5 | 68.5 | 38.0 | 51.2 | 35.0 | 60.0 | 63.2 | 65.0 | 65.2 | 65.4 | 28.0 | 18.0 | 48.0 | 28.5 |
|  | Heat deformation temperature (¼", 264 psi, no annealing) (°C.) | 104.0 | 109.0 | 107.5 | 104.0 | 108.0 | 104.5 | 106.0 | 107.0 | 107.0 | 107.0 | 107.0 | 102.0 | 101.0 | 115.0 | 88.5 |
|  | Processability (230° C., 60 kg/cm$^2$) (ml/min) | 0.42 | 0.40 | 0.39 | 0.45 | 0.40 | 0.40 | 0.42 | 0.40 | 0.37 | 0.37 | 0.37 | 0.45 | 0.48 | 0.10 | 0.45 |
|  | Solvent resistance (toluene/cyclohexane, 3/7) (%) | 0.45 | 0.55 | 0.65 | 0.47 | 0.50 | 0.50 | 0.50 | 0.55 | 0.30 | 0.30 | 0.30 | 0.80 | 0.85 | 0.40 | 0.50 |

EXAMPLES 9 TO 18 AND COMPARATIVE EXAMPLES 8 TO 19

(1) Polycarbonate resin:

As the polycarbonate resin, commercially available polycarbonate resin ("Panlite L-1250W" manufactured by Teijin Kasei) was used.

(2) Graft polymer:

Polybutadiene (50 parts (as solid components)), potassium persulfate (0.5 part), potassium oleate (0.5 part) and dodecylmercaptan (0.3 part) were mixed together, styrene (36 parts) and acrylonitrile (14 parts) were added thereto, and the resulting mixture was subjected to polymerization at 70° C. for 3 hours, followed by aging for 1 hour. The reaction mixture was salted out, and the precipitate was collected and dried to obtain a graft polymer.

(3) Copolymer:

(A) To a mixture of styrene and acrylonitrile in a weight proportion of 70:30 (100 parts), t-dodecylmercaptan (0.1 part) was added, and the resultant mixture was subjected to prepolymerization in a bulk state at 90° C. for 3 hours. Thereafter, water (210 parts), methyl cellulose (1.0 part) and benzoyl peroxide (0.3 part) were added thereto. The resulting aqueous dispersion was heated from 30° C. to 90° C., and polymerization was carried out for 10 hours. By dehydration from the reaction mixture, there was obtained a copolymer (A) (intrinsic viscosity, 0.50).

(B) As the copolymer(B), commercially available styrene-acrylonitrile copolymer ("Sevian NJD" manufactured by Daicel; intrinsic viscosity, 0.63) was used.

(4) Plasticizer:

The following plasticizers were used:

| Plasticizer | Light transmission (%) |
|---|---|
| Diisodecyl phthalate | 88.5 |
| Di-2-ethylhexyl adipate | 80.7 |
| Dibutyl sebacate | 85.5 |
| Citric acid triester | 86.0 |
| Trimellitic acid ester | 88.0 |
| Epoxybutyl stearate | 52.5 |
| Methylphthalyl glcolate | 81.0 |
| Methylacetyl ricinoleate | 82.0 |
| Polyester ("PN-250" manufactured by Adeka Argus) | 86.5 |
| Tricresyl phosphite | 85.0 |
| Epoxy soybean oil ("O-130P" manufactured by Adeka Argus) | 72.0 |
| Epoxy compound ("Drapex 3.2" manufactured by Adeka Argus) | 53.0 |

(5) Thermoplastic composition:

The polycarbonate resin, the graft polymer and the copolymer were mixed together with the plasticizer in a proportion as shown in Table 2 by the aid of Bumbury's mixer to give a thermoplastic composition.

The physical properties of the obtained thermoplastic composition are shown in Table 2.

TABLE 2

| | | Example | | | | | | | | | | | Comparative Example | | | | | | | | | | | |
|---|---|---|---|---|---|---|---|---|---|---|---|---|---|---|---|---|---|---|---|---|---|---|---|---|
| | | 9 | 10 | 11 | 12 | 13 | 14 | 15 | 16 | 17 | 18 | 8 | 9 | 10 | 11 | 12 | 13 | 14 | 15 | 16 | 17 | 18 | 19 |
| Thermoplastic composition (part(s)) | Polycarbonate resin | 60 | 50 | 50 | 50 | 50 | 60 | 50 | 50 | 50 | 50 | 50 | 90 | 13 | 50 | 50 | 50 | 50 | 90 | 13 | 50 | 50 | 50 |
| | Blend | 40 | 50 | 50 | 50 | 50 | 40 | 50 | 50 | 50 | 50 | 50 | 10 | 87 | 50 | 50 | 50 | 50 | 10 | 87 | 50 | 50 | 50 |
| | Graft polymer | 75 | 50 | 60 | 60 | 60 | 75 | 50 | 60 | 60 | 60 | 60 | 50 | 80 | 4 | 60 | 60 | 60 | 50 | 80 | 4 | 60 | 60 |
| | Copolymer (A) | 25 | — | — | — | 40 | 25 | — | — | — | 40 | 40 | 50 | 20 | 96 | 40 | 40 | 40 | 50 | — | 96 | 40 | 40 |
| | Copolymer (B) | — | 50 | 40 | 40 | — | — | 50 | 40 | 40 | — | — | — | — | — | — | — | — | — | 20 | — | — | — |
| | | — | 50 | 40 | 40 | — | — | 50 | 40 | 40 | — | — | — | — | — | — | — | — | — | 20 | — | — | — |
| | Plasticizer | | | | | | | | | | | | | | | | | | | | | | |
| | Diisodecyl phthalate | 4 | — | — | — | — | — | — | — | — | — | — | — | — | — | — | — | — | — | — | — | — | — |
| | Di-2-ethyl-hexyl adipate | — | 3 | — | 4 | — | — | — | — | — | — | — | — | — | 3 | — | — | — | — | — | — | — | — |
| | Dibutyl sebacate | — | — | 5 | — | — | — | — | — | — | — | — | — | — | — | 24 | — | — | — | — | — | — | — |
| | Citric acid triester | — | — | — | — | 3 | — | — | — | — | — | — | — | — | — | — | 0.2 | — | — | — | — | — | — |
| | Trimellitic acid ester | — | — | — | — | — | — | — | — | — | — | — | — | 4 | — | — | — | — | — | — | — | — | — |
| | Epoxybutyl stearate | — | — | — | — | — | — | — | — | — | — | 2 | — | — | — | — | — | — | — | — | — | — | — |
| | Methylphthalyl glycolate | — | — | — | — | — | 3 | — | — | — | — | — | — | — | — | — | — | — | — | — | — | — | — |
| | Methylacetyl ricinoleate | — | — | — | — | — | — | 3 | — | — | — | — | — | — | — | — | — | — | — | — | — | — | — |
| | "PN-250" | — | — | — | — | — | — | — | 4 | — | — | — | — | — | — | — | — | — | — | — | — | — | — |
| | Tricresyl phosphite | — | — | — | — | — | — | — | 1 | — | — | — | — | — | — | — | — | 3 | — | 3 | 3 | — | 0.3 |
| | "O-130" | — | — | — | — | — | — | — | — | — | — | — | — | — | — | — | — | — | — | — | — | — | — |
| | "Drapex 3.2" | — | — | — | — | — | — | — | — | — | 1 | — | — | — | — | — | — | 2 | — | — | — | — | — |
| Physical property | Weld strength (−30° C.) (kg·cm) | >120 | >120 | >120 | >120 | >120 | >120 | >120 | >120 | >120 | >120 | 15 | 25 | 100 | 15 | 105 | 30 | 15 | 30 | 105 | 20 | 110 | 25 |
| | Notched Izod impact strength (20° C., ⅛") (kg·cm/cm) | 65.0 | 47.5 | 58.5 | 56.3 | 57.2 | 58.5 | 49.0 | 63.2 | 48.8 | 51.0 | 18.3 | 21.5 | 68.3 | 13.2 | 70.0 | 48.5 | 17.0 | 23.0 | 62.5 | 15.2 | 68.0 | 47.5 |
| | Flexural strength | 1.8 | 2.0 | 1.9 | 1.8 | 1.9 | 1.9 | 1.9 | 1.8 | 2.0 | 2.1 | 1.8 | 2.1 | 1.4 | 2.4 | 1.5 | 2.0 | 1.9 | 2.1 | 1.4 | 2.4 | 1.4 | 2.0 |
| | Flexural modulus (×10⁴ kg/cm²) | 98.5 | 100.5 | 93.5 | 94.0 | 101.0 | 99.0 | 101.0 | 103.0 | 99.5 | 105.2 | 95.0 | 118.0 | 85.5 | 106.0 | 82.0 | 109.5 | 97.0 | 119.5 | 84.0 | 103.0 | 83.5 | 108.0 |
| | Heat deformation temperature (°C.) | 0.45 | 0.50 | 0.70 | 0.65 | 0.50 | 0.47 | 0.48 | 0.60 | 0.58 | 0.40 | 0.47 | 0.23 | 0.10 | 0.70 | 1.35 | 0.20 | 0.40 | 0.23 | 0.12 | 0.73 | 1.40 | 0.20 |
| | Process- | | | | | | | | | | | | | | | | | | | | | | |

| | Example | | | | | | | | | | Comparative Example | | | | | | | | | |
|---|---|---|---|---|---|---|---|---|---|---|---|---|---|---|---|---|---|---|---|---|
| | 9 | 10 | 11 | 12 | 13 | 14 | 15 | 16 | 17 | 18 | 8 | 9 | 10 | 11 | 12 | 13 | 14 | 15 | 16 | 17 | 18 | 19 |
| ability (Koka type, 230° C., 60 kg/cm²) (ml/min) | | | | | | | | | | | | | | | | | | | | | |

What is claimed is:

1. A thermoplastic composition having improved weld strength which comprises a blend essentially consisting of:
   (A) 20 to 80% by weight based on the weight of A and B of a thermoplastic polycarbonate resin;
   (B) 80 to 20% by weight based on the weight of A and B of a graft polymer obtained by grafting at least one aromatic vinyl compound and at least one member of the group consisting of vinyl cyanides and alkyl unsaturated carboxylates onto a conjugated diene rubber or a mixture of a conjugated diene rubber with a copolymer of at least one aromatic vinyl compound and at least one member of the group consisting of vinyl cyanides and alkyl unsaturated carboxylates, the copolymer being present in an amount of not more than 90% by weight on the basis of the combined amount of the graft polymer and the copolymer; and
   (C) a polyolefin or a plasticizer having a light transmission of not less than 70% when determined on a 20 micron film prepared from a solution of the plasticizer (0.25 g) and acrylonitrile-styrene copolymer (weight ratio of acrylonitrile and styrene, 30:70; 0.75 g) in acetone (10 ml), the weight proportion of the blend, (A)+(B), and the polyolefin or the plasticizer (C) being 100:0.2–20.

2. The composition according to claim 1, wherein the blend comprises the polycarbonate and the graft polymer.

3. The composition according to claim 2, wherein the polyolefin is contained in an amount of 0.2 to 10 parts by weight based on 100 parts of the blend.

4. The composition according to claim 3, wherein the polyolefin comprises polyethylene having a molecular weight of not less than 2,000 or polypropylene having a molecular weight of not less than 5,000, or their mixture.

5. The composition according to claim 1, wherein the blend comprises the polycarbonate resin, the graft polymer and the copolymer.

6. The composition according to claim 5, wherein the plasticizer is contained in an amount of 0.5 to 20 parts by weight based on 100 parts of the blend.

7. The composition according to claim 6, wherein the plasticizer comprises an ester compound, an epoxy compound or a phosphate compound.

* * * * *